US012698772B2

(12) United States Patent
Lee et al.

(10) Patent No.: US 12,698,772 B2
(45) Date of Patent: Aug. 4, 2026

(54) ELECTRIC COMPRESSOR

(71) Applicant: Hanon Systems, Daejeon (KR)

(72) Inventors: Hyun Woo Lee, Daejeon (KR); Sung Taeg Oh, Daejeon (KR); Min Gyu Kim, Daejeon (KR); Seung Kil Kim, Daejeon (KR); Sang Woo Bae, Daejeon (KR); Hew Nam Ahn, Daejeon (KR); Young Seop Yoon, Daejeon (KR); Je Su Yun, Daejeon (KR)

(73) Assignee: HANON SYSTEMS (KR)

( * ) Notice: Subject to any disclaimer, the term of this patent is extended or adjusted under 35 U.S.C. 154(b) by 55 days.

(21) Appl. No.: 18/861,478

(22) PCT Filed: Jul. 31, 2023

(86) PCT No.: PCT/KR2023/011092
§ 371 (c)(1),
(2) Date: Oct. 29, 2024

(87) PCT Pub. No.: WO2024/085384
PCT Pub. Date: Apr. 25, 2024

(65) Prior Publication Data

US 2025/0347279 A1 Nov. 13, 2025

(30) Foreign Application Priority Data

Oct. 19, 2022 (KR) ........................ 10-2022-0134525

(51) Int. Cl.
*F04C 23/02* (2006.01)
*F04C 29/00* (2006.01)
(Continued)

(52) U.S. Cl.
CPC .......... *F04C 23/02* (2013.01); *F04C 29/0085* (2013.01); *H01R 13/04* (2013.01); *H01R 13/707* (2013.01); *F04C 2240/403* (2013.01)

(58) Field of Classification Search
CPC ............................ F04C 23/02; F04C 29/0085; F04C 2240/403; H01R 13/04; H01R 13/707
See application file for complete search history.

(56) References Cited

U.S. PATENT DOCUMENTS

2009/0321128 A1 12/2009 Koitabashi et al.
2015/0326090 A1* 11/2015 Arashi ................... H02K 5/225 310/71
2022/0052496 A1* 2/2022 Hoffmann ............ H01R 13/707

FOREIGN PATENT DOCUMENTS

JP 2022156947 A 10/2022
KR 101661765 B1 9/2016
(Continued)

*Primary Examiner* — Charles G Freay
*Assistant Examiner* — Joseph S. Herrmann
(74) *Attorney, Agent, or Firm* — Shumaker, Loop & Kendrick, LLP; James D. Miller

(57) ABSTRACT

An electric compressor including a motor configured to generate power, a compression mechanism configured to compress a refrigerant by receiving power from the motor, an inverter configured to control the motor, a connector connected to an external device, a power line extending from the connector to the inverter to transmit electric power, which is supplied from the external device, to the inverter, and an interlock line extending from the connector to the inverter to transmit a signal to the inverter when the connector is separated from the external device, in which the power line and the interlock line are formed in different ways, thereby preventing insulation breakdown between the power line and the interlock line, easily assembling the power line and the inverter, and easily assembling the interlock line and the inverter.

7 Claims, 5 Drawing Sheets

(51) Int. Cl.
*H01R 13/04* (2006.01)
*H01R 13/707* (2006.01)

(56) References Cited

FOREIGN PATENT DOCUMENTS

| | | | |
|---|---|---|---|
| KR | 1020210098326 | A | 8/2021 |
| KR | 102454702 | B1 | 10/2022 |

* cited by examiner

ELECTRIC COMPRESSOR

CROSS REFERENCE TO RELATED PATENT APPLICATIONS

This is a U.S. national phase patent application of PCT/KR2023/011092 filed Jul. 31, 2023, which claims the benefit of and priority to Korean Patent Application No. 10-2022-01344525 filed on Oct. 19, 2022, the entire contents of each of which are incorporated herein by reference for all purposes.

TECHNICAL FIELD

The present invention relates to an electric compressor, and more particularly, to an electric compressor capable of compressing a refrigerant with driving power of a motor controlled by an inverter.

BACKGROUND ART

In general, a compressor refers to a device for compressing a fluid such as a refrigerant gas and is applied to an air conditioning system for a building, an air conditioning system for a vehicle, or the like.

Depending on compression methods, the compressors may be classified into a reciprocating compressor configured to compress a refrigerant by reciprocating a piston, and a rotary compressor configured to compress a refrigerant while performing a rotational motion. Depending on power transmission methods, the reciprocating compressors may be classified into a crank compressor configured to transmit power to a plurality of pistons by using a crank, and a swash plate compressor configured to transmit power to a rotary shaft on which a swash plate is installed, and the rotary compressors may be classified into a vane rotary compressor using a rotating rotary shaft and a vane, and a scroll compressor using an orbiting scroll and a fixed scroll.

In addition, depending on operating methods, the compressors may be classified into a mechanical compressor using an engine, and an electric compressor using a motor.

In this case, an inverter configured to control a motor is applied to the electric compressor to adjust a compression capacity.

FIG. 1 is a cross-sectional view illustrating an electric compressor according to an embodiment of the related art, and FIG. 2 is a perspective view illustrating a printed circuit board and a connector of an inverter of the electric compressor in FIG. 1.

With reference to FIGS. 1 and 2 attached hereto, the electric compressor according to the embodiment of the related art includes a motor 20 configured to generate power, a compression mechanism 40 configured to compress a refrigerant by receiving power from the motor 20, an inverter 50 configured to control the motor 20, and a connector 60 configured to connect the inverter 50 to an external device. The connector 60 includes a high-voltage connector 62 connected to a high-voltage current application unit connected to the inverter 50 to supply electric power, and a low-voltage connector 64 connected to a low-voltage current application unit to perform communication with the inverter 50.

In this case, in the case of the high-voltage connector 62, a power line 72' is provided to extend from the high-voltage connector 62 to the inverter 50 to transmit electric power, which is supplied from the high-voltage current application unit, to the inverter 50, an interlock line 74' is provided to extend from the high-voltage connector 62 to the inverter 50 to transmit a signal to the inverter 50 when the high-voltage connector 62 is separated from the high-voltage current application unit. The power line 72' and the interlock line 74' are formed in the same manner. That is, both the power line 72' and the interlock line 74' are each configured as a pin extending in one direction from the high-voltage connector 62 to the inverter 50.

However, in the electric compressor according to the embodiment of the related art, both the power line 72' and the interlock line 74' are configured as the pins, which causes a problem of insulation breakdown and a deterioration in assemblability. That is, because both the power line 72' and the interlock line 74' are configured as the pins extending in one direction, the interlock line 74' is disposed adjacent to the power line 72', and the insulation breakdown occurs between the power line 72' and the interlock line 74' because no sheath is provided because of the nature of the pins. Further, because a magnitude of an allowable current required for the interlock line 74' is small, the interlock line 74' and a socket 56' of the inverter 50, which accommodates the interlock line 74', have small diameters, which makes it difficult to assemble the interlock line 74' and the inverter 50.

Meanwhile, FIG. 3 is a perspective view illustrating a printed circuit board and a connector of an inverter of an electric compressor according to another embodiment of the related art.

With reference to FIG. 3 attached hereto, a high-voltage connector 62 of the electric compressor according to another embodiment of the related art also includes a power line 72" and an interlock line 74". However, both the power line 72" and the interlock line 74" are formed as wires bendably extending from the high-voltage connector 62 to the inverter 50 and fastened to a printed circuit board 52, by a fastening member such as a bolt, while penetrating the printed circuit board 52 of the inverter 50.

In this case, an interval between the power line 72" and the interlock line 74" is increased, and a sheath **74*c*" is provided. Therefore, insulation breakdown between the power line 72" and the interlock line 74" is suppressed, but the deterioration in assemblability is not solved. That is, in comparison with the embodiment of the related art illustrated in FIGS. 1 and 2, the assemblability between the interlock line 74" and the inverter 50 is somewhat improved, but the assemblability between the power line 72" and the inverter 50** deteriorates.

SUMMARY

Accordingly, an object of the present invention is to provide an electric compressor, in which insulation breakdown between a power line, which extends from a connector to an inverter to supply electric power, and an interlock line, which extends from the connector to the inverter to transmit a signal for separating the connector to the inverter, may be prevented, the power line and the inverter may be easily assembled, and the interlock line and the inverter may be easily assembled.

In order to achieve the above-mentioned object, the present invention provides an electric compressor including: a motor configured to generate power; a compression mechanism configured to compress a refrigerant by receiving power from the motor; an inverter configured to control the motor; a connector connected to an external device; a power line extending from the connector to the inverter to transmit electric power, which is supplied from the external device, to the inverter; and an interlock line extending from the connector to the inverter to transmit a signal to the inverter when the connector is separated from the external device, in which the power line and the interlock line are formed in different ways.

The power line may be configured as a pin extending from the connector to the inverter in one direction, and the interlock line may be configured as a wire bendably extending from the connector to the inverter.

The wire may include: a conductive wire made of an electrically conductive material; a first interlock connector coupled to an end of the conductive wire; and a sheath configured to surround the conductive wire.

The inverter may include: a socket into which the pin is inserted; and a second interlock connector fastened to the first interlock connector, and the second interlock connector may be provided at a position spaced apart from the socket.

The inverter may include a printed circuit board, the socket may be mounted on the printed circuit board at a position that faces the connector, and the second interlock connector may be mounted on the printed circuit board at a position that does not face the connector.

The printed circuit board may include: a first surface facing the connector; and a second surface configured to define a rear surface of the first surface, the socket may be provided on the first surface, and the second interlock connector may be provided on the second surface.

The printed circuit board may include a wire passing hole through which the wire passes.

The wire passing hole may be formed to be debossed in an outer peripheral surface of the printed circuit board.

The wire passing hole may be formed to be smaller than the first interlock connector.

Any one of the first interlock connector and the second interlock connector may be configured as a male connector, and the other of the first interlock connector and the second interlock connector may be configured as a female connector.

An electric compressor according to the present invention includes a motor configured to generate power, a compression mechanism configured to compress a refrigerant by receiving power from the motor, an inverter configured to control the motor, a connector connected to an external device, a power line extending from the connector to the inverter to transmit electric power, which is supplied from the external device, to the inverter, and an interlock line extending from the connector to the inverter to transmit a signal to the inverter when the connector is separated from the external device, in which the power line and the interlock line are formed in different ways, thereby preventing insulation breakdown between the power line and the interlock line, easily assembling the power line and the inverter, and easily assembling the interlock line and the inverter.

DESCRIPTION OF AN EMBODIMENT

Hereinafter, an electric compressor according to the present invention will be described in detail with reference to the accompanying drawings.

Figure 4:
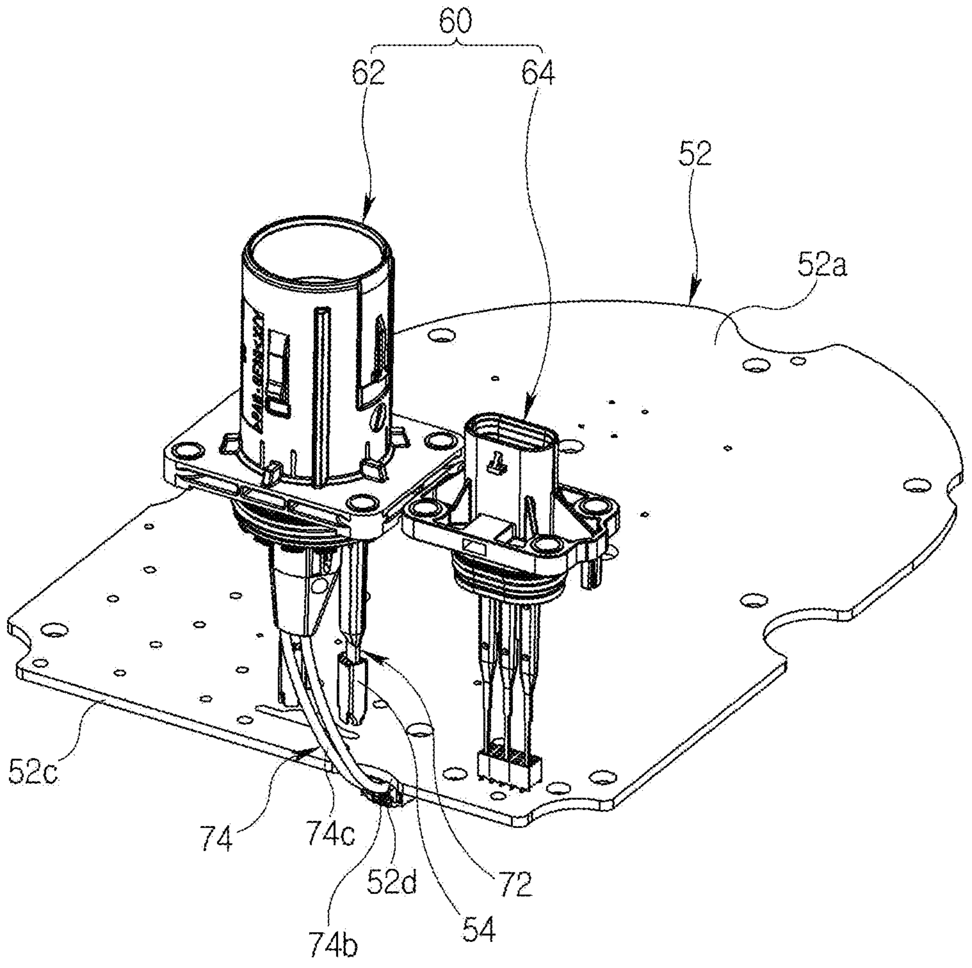
FIG. 4 is a perspective view illustrating a printed circuit board and a connector of an inverter of an electric compressor according to an embodiment of the present invention.
Figure 5:
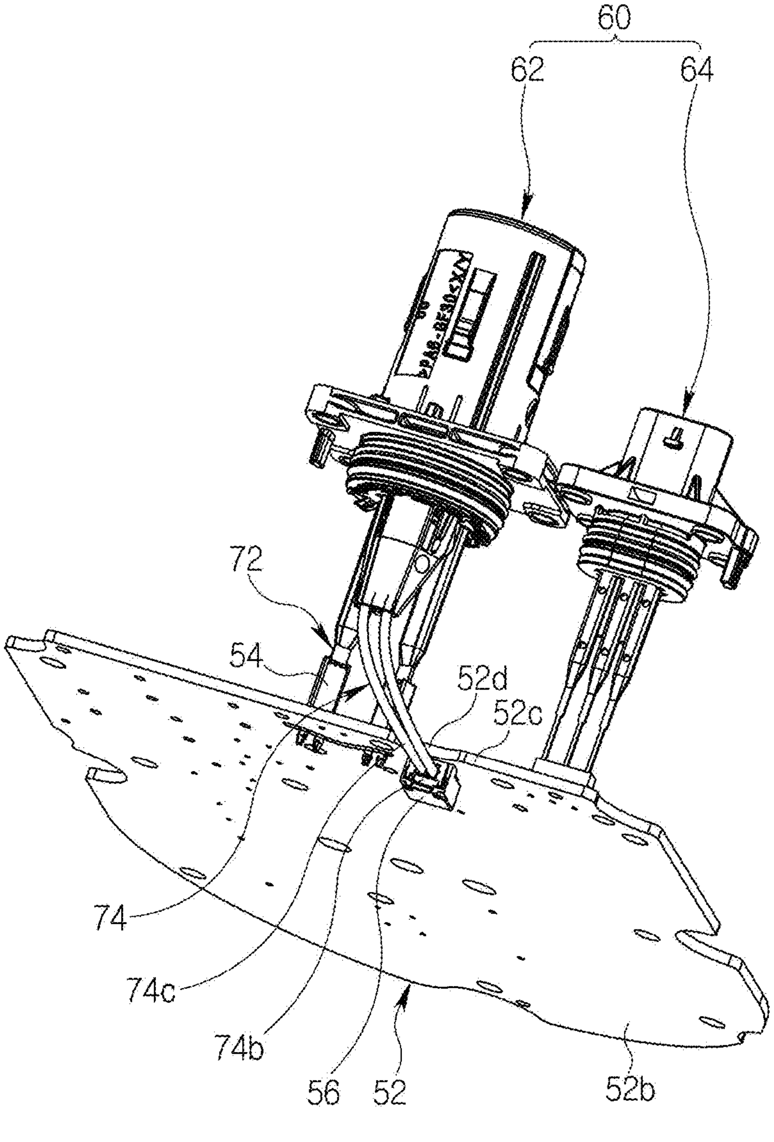
FIG. 5 is a perspective view illustrating a rear side of FIG. 4.

FIG. 4 is a perspective view illustrating a printed circuit board and a connector of an inverter of an electric compressor according to an embodiment of the present invention, and FIG. 5 is a perspective view illustrating a rear side of FIG. 4.

Figure 1:
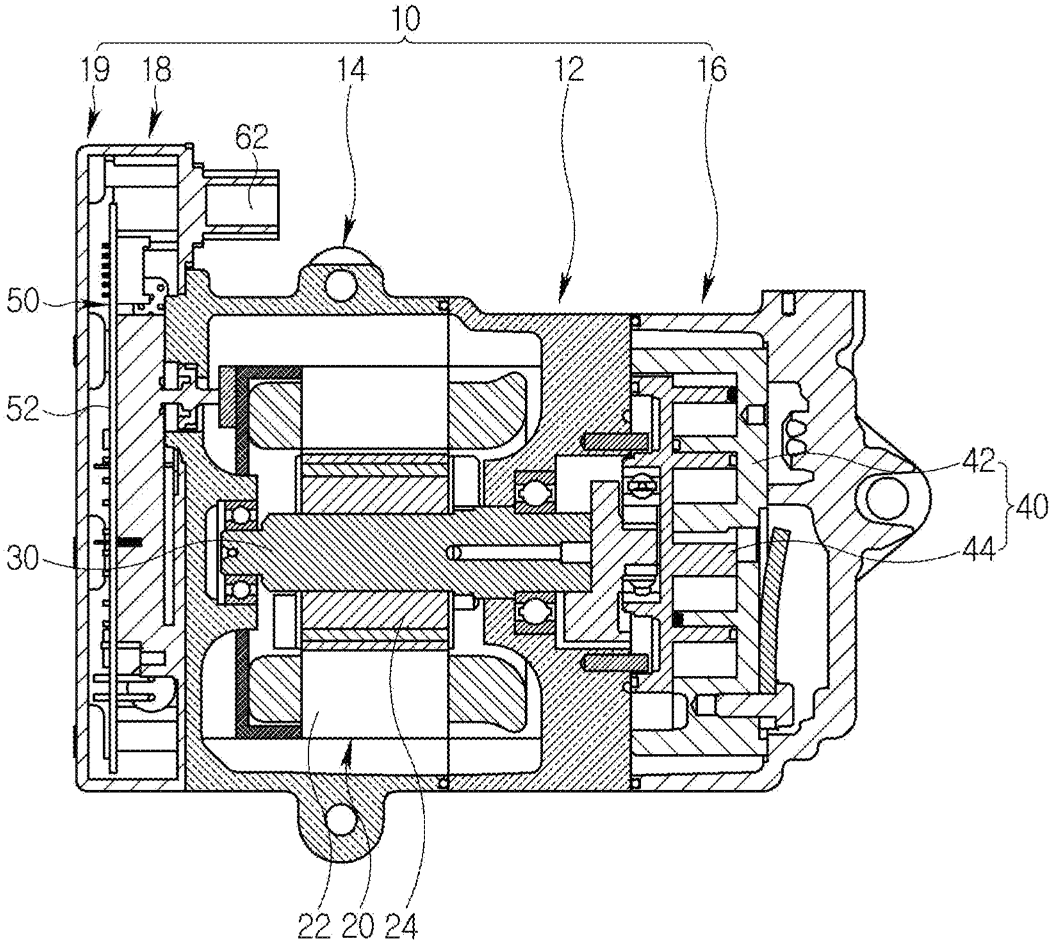
FIG. 1 PRIOR ART
FIG. 1 is a cross-sectional view illustrating an electric compressor according to an embodiment of the related art.
Figure 2:
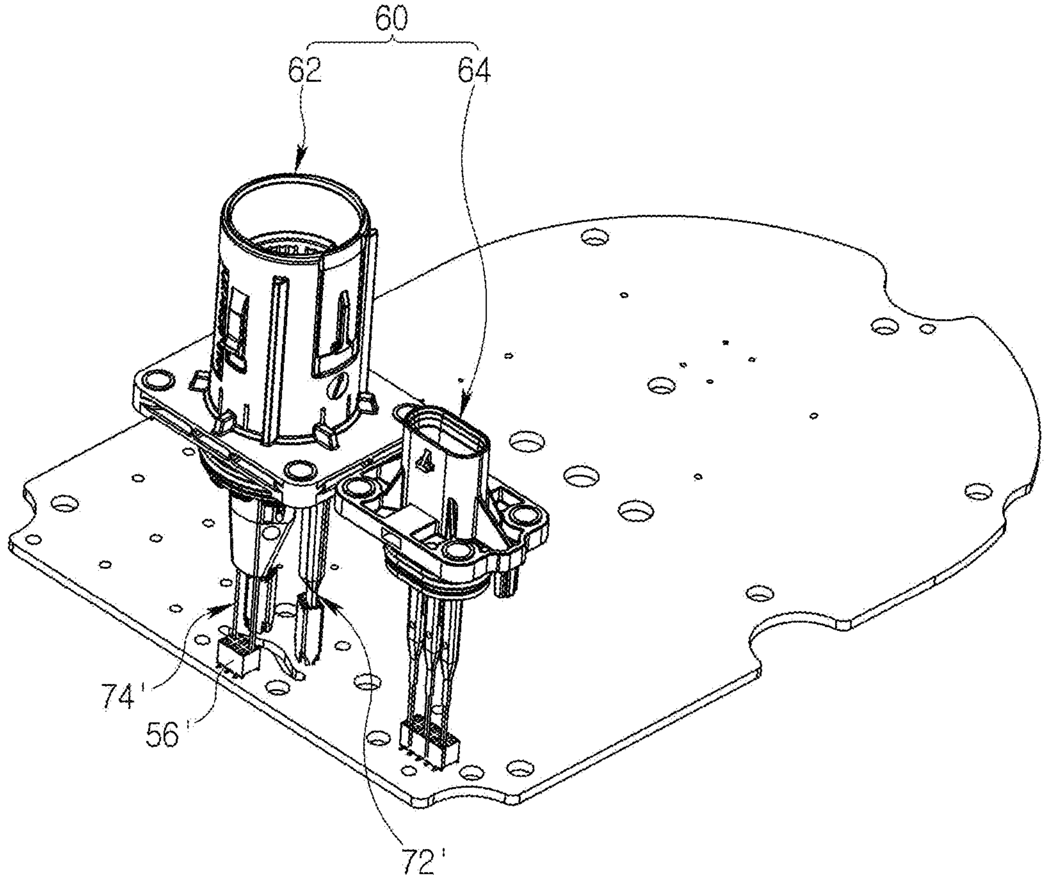
FIG. 2 PRIOR ART
FIG. 2 is a perspective view illustrating a printed circuit board and a connector of an inverter of the electric compressor in FIG. 1.
Figure 3:
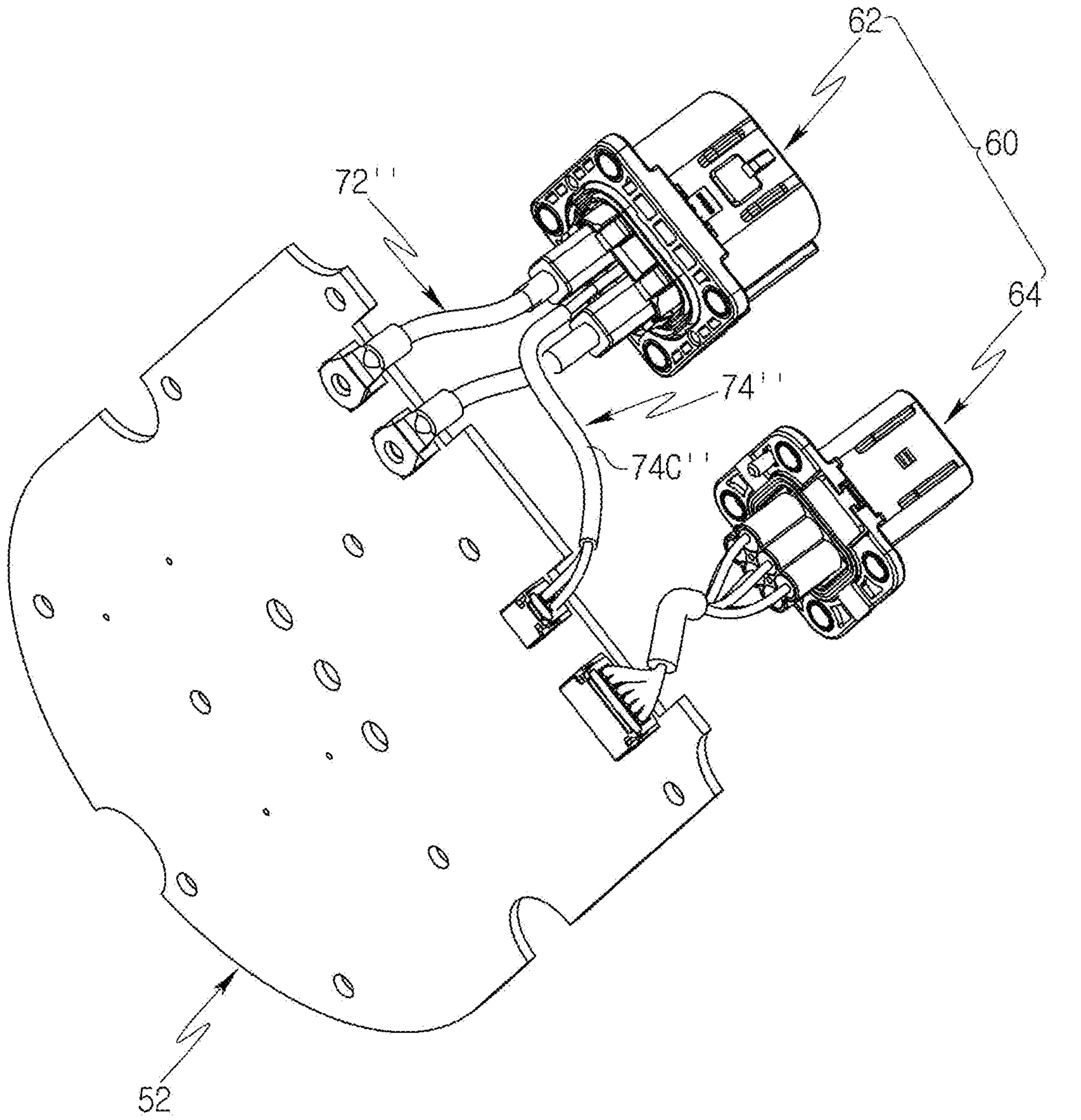
FIG. 3 PRIOR ART
FIG. 3 is a perspective view illustrating a printed circuit board and a connector of an inverter of an electric compressor according to another embodiment of the related art.

Meanwhile, for convenience of description, constituent elements, which are not illustrated in FIGS. 4 and 5, refer to the constituent elements illustrated in FIG. 1.

With reference to FIGS. 4, 5, and 1 attached hereto, the electric compressor according to the embodiment of the present invention may include a housing 10, a compression mechanism 40 disposed in the housing 10 and configured to compress a refrigerant, a motor 20 configured to provide power to the compression mechanism 40, an inverter 50 configured to control the motor 20, and a connector 60 configured to connect the inverter 50 to an external device.

The housing 10 may include a center housing 12, a front housing 14 coupled to the center housing 12 and configured to define a motor accommodation space configured to accommodate the motor 20, an inverter housing 18 coupled to the front housing 14 at a side opposite to the center housing 12 based on the front housing 14 and configured to define an inverter accommodation space configured to accommodate the inverter 50, an inverter cover 19 coupled to the inverter housing 18 at a side opposite to the front housing 14 based on the inverter housing 18 and configured to cover the inverter accommodation space, and a rear housing 16 coupled to the center housing 12 at a side opposite to the front housing 14 based on the center housing 12 and configured to define a compression mechanism accommodation space configured to accommodate the compression mechanism 40, the rear housing 16 having a discharge chamber configured to accommodate the refrigerant discharged from the compression mechanism 40.

In this case, the inverter housing 18 may include a connector hole through which the connector 60 is exposed to the outside.

The compression mechanism 40 may include a fixed scroll 42 fixedly installed, and an orbiting scroll 44 configured to engage with the fixed scroll 42 and define a compression chamber together with the fixed scroll 42, the orbiting scroll 44 being configured to perform an orbital motion by a rotary shaft 30 configured to transmit power from the motor 20 to the compression mechanism 40.

In this case, in the present embodiment, the compression mechanism 40 is configured as a so-called scroll type. However, the present invention is not limited thereto. The compression mechanism 40 may be configured as other types such as a reciprocating type and a vane rotary type.

The motor 20 may include a stator 22 supported on the front housing 14, and a rotor 24 positioned in the stator 22 and configured to be rotated by an interaction with the stator 22. The rotor 24 may be press-fitted with the rotary shaft 30.

The inverter 50 may include a printed circuit board 52 on which a plurality of elements is mounted.

The printed circuit board 52 may include a high-voltage part mounted with elements (e.g., switching elements such as a micro-control unit (MCU), an insulated gate bipolar transistor (IGBT), or a metal-oxide-semiconductor field-effect transistor (MOSFET)) for operating power for a main integrated circuit (IC) and operating power for the motor 20, and a low-voltage part mounted with communication elements for communication with a vehicle or the like. The elements mounted on the high-voltage part and the elements mounted on the low-voltage part may be electrically connected to one another through patterns.

Further, the printed circuit board 52 may include a socket 54 into which a pin of a power line 72 to be described below is inserted, and a second interlock connector 56 fastened to a first interlock connector 74*b* to be described below. The second interlock connector 56 may be provided at a position spaced apart from the socket 54. That is, the socket 54 may be mounted on the printed circuit board 52 and disposed at a position facing the connector 60, and the second interlock connector 56 may be mounted on the printed circuit board 52 and disposed at a position that does not face the connector 60.

In this case, the position, which does not face the connector 60, may mean a position spaced apart from the position, which faces the connector 60, in an extension direction of the printed circuit board 52 or means a position opposite to the printed circuit board 52 in a thickness direction. That is, the printed circuit board 52 may include a first surface 52*a* facing the connector 60 (directed toward the front housing 14), and a second surface 52*b*, which is a rear surface (directed toward the inverter cover 19) opposite to the first surface 52*a*. The socket 54 may be provided at a position on the first surface 52*a* that faces the connector 60. The second interlock connector 56 may be provided at a position on the second surface 52*b* that does not overlap the connector 60 in a thickness direction of the printed circuit board 52. Alternatively, unlike the present embodiment, when the socket 54 is positioned at a position on the first surface 52*a* that faces the connector 60, the second interlock connector 56 may be provided at a position on the first surface 52*a* that does not face the connector 60, or the second interlock connector 56 may be provided at a position on the second surface 52*b* that overlaps the connector 60 in the thickness direction of the printed circuit board 52. However, in order to prevent insulation breakdown and improve assemblability, the socket 54 and the second interlock connector 56 may be provided at the positions identical to those in the present embodiment.

Further, the printed circuit board 52 may further include a wire passing hole 52*d* through which a wire of an interlock line 74 to be described below passes.

In this case, in case that the wire passing hole 52*d* is formed in the printed circuit board 52, the wire passing hole 52*d* may be formed to be larger than the first interlock connector 74*b* to be described below so that the first interlock connector 74*b* to be described below may pass through the wire passing hole 52*d*. However, in this case, because the elements need to be provided at other positions to avoid a space occupied by the wire passing hole 52*d*, which may cause a problem in that a size of the printed circuit board 52 needs to be increased. In view of this, in the present embodiment, in order to suppress an increase in size of the printed circuit board 52, the wire passing hole 52*d* may be formed to be smaller than the first interlock connector 74*b*. Further, the wire passing hole 52*d* may be formed to be debossed in an outer peripheral surface 52*c* of the printed circuit board 52 so that the wire of the interlock line 74 to be described below may pass through the wire passing hole 52*d* even though the first interlock connector 74*b* does not pass through the wire passing hole 52*d*.

The connector 60 may include a high-voltage connector 62 connected to a high-voltage current application unit to supply electric power to the inverter 50, and a low-voltage connector 64 connected to a low-voltage current application unit to perform communication with the inverter 50.

In this case, in the case of the high-voltage connector 62, a power line 72 is provided to extend from the high-voltage connector 62 to the inverter 50 to transmit electric power, which is supplied from the high-voltage current application unit, to the inverter 50, an interlock line 74 is provided to extend from the high-voltage connector 62 to the inverter 50 to transmit a signal to the inverter 50 when the high-voltage connector 62 is separated from the high-voltage current application unit. The power line 72 and the interlock line 74 are formed in different ways.

Specifically, the power line 72 may be configured as a pin extending from the high-voltage connector 62 to the printed circuit board 52 in one direction.

Further, the pin of the power line 72 may be automatically fixedly inserted into the socket 54 of the printed circuit board 52 when the printed circuit board 52 becomes close to the high-voltage connector 62 while being inserted into the inverter accommodation space.

The interlock line 74 may be configured as a wire bendably extending from the high-voltage connector 62 to the printed circuit board 52.

In this case, the wire of the interlock line 74 may include a conductive wire made of an electrically conductive material, the first interlock connector 74*b* connected to an end of the conductive wire, and a sheath 74*c* configured to surround the conductive wire.

Further, the wire of the interlock line 74 may pass through the wire passing hole 52*d* of the printed circuit board 52 and be fixed as the first interlock connector 74*b* is coupled to the second interlock connector 56 provided on the second surface 52*b* of the printed circuit board 52.

In this case, the wire of the interlock line 74 is configured to pass through the wire passing hole 52*d* before the wire passing hole 52*d* is covered by the inverter housing 18 when the printed circuit board 52 is inserted into the inverter accommodation space. The first interlock connector 74*b* may be fastened to the second interlock connector 56 after the printed circuit board 52 is inserted into the inverter accommodation space, and the pin of the power line 72 is inserted into the socket 54 of the printed circuit board 52, as described above.

In this case, any one of the first interlock connector 74*b* and the second interlock connector 56 may be formed as a male connector, and the other of the first interlock connector 74*b* and the second interlock connector 56 may be formed as a female connector, such that the first interlock connector 74*b* and the second interlock connector 56 may be easily and stably detached.

Hereinafter, an operational effect of the electric compressor according to the present embodiment will be described.

That is, when electric power is applied to the motor 20, a low-temperature, low-pressure refrigerant may be introduced into the motor accommodation space through a suction port formed in the front housing 14. The refrigerant in the motor accommodation space is introduced into the compression mechanism 40 and compressed to a high-temperature, high-pressure refrigerant, and the refrigerant may be discharged to the outside of the housing 10 through the discharge chamber.

Further, the cooling efficiency may be variably controlled as the motor 20 is controlled by the inverter 50.

In this case, the inverter 50 operates by receiving electric power through the power line 72, and the safety of the supply of electric power may be ensured by the interlock line 74. That is, in case that the high-voltage connector 62 is separated from the high-voltage current application unit, the relevant signal may be transmitted to the low-voltage current application unit through the interlock line 74, the inverter 50, and the low-voltage connector 64, such that the supply of electric power of the high-voltage current application unit may be controlled to be cut off.

In this case, in the electric compressor according to the present embodiment, the power line 72 and the interlock line 74 are provided in different ways, such that insulation breakdown between the power line 72 and the interlock line 74 may be prevented, the power line 72 and the inverter 50 may be easily assembled, and the interlock line 74 and the inverter 50 may be easily assembled.

Specifically, the power line 72 is configured as the pin extending from the high-voltage connector 62 to the inverter 50 in one direction and automatically fixedly inserted into the socket 54 of the inverter 50 when the inverter 50 is inserted into the inverter accommodation space, which may improve the assemblability between the power line 72 and the inverter 50.

Further, the interlock line 74 is configured as the wire bendably extending from the high-voltage connector 62 to the inverter 50, such that the power line 72 may be connected to the inverter 50 at the position that faces the high-voltage connector 62, whereas the interlock line 74 may be connected to the inverter 50 at the position that does not face the high-voltage connector 62. That is, the interlock line 74 may be spaced apart from the power line 72 as far as possible. Therefore, the insulation between the power line 72 and the interlock line 74 may be ensured.

Further, the interlock line 74 is configured as the wire having the sheath 74*c*, such that the insulation between the power line 72 and the interlock line 74 may be more safely ensured.

Further, the interlock line 74 and the inverter 50 are configured to be connected and separated by the first interlock connector 74*b* and the second interlock connector 56, which may improve the assemblability between the interlock line 74 and the inverter 50.

Meanwhile, in the present embodiment, the power line 72 and the interlock line 74 extending from the high-voltage connector 62 to the inverter 50 are formed in different ways. However, the lines extending from the low-voltage connector 64 to the inverter 50 may be formed in different ways.

The invention claimed is:

1. An electric compressor comprising:

a motor configured to generate power;

a compression mechanism configured to compress a refrigerant by receiving the power from the motor;

an inverter configured to control the motor;

a connector connected to an external device;

a power line extending from the connector to the inverter to transmit electric power, which is supplied from the external device, to the inverter; and an interlock line extending from the connector to the inverter to transmit a signal to the inverter when the connector is separated from the external device, wherein the power line and the interlock line are formed in different ways, wherein the power line is configured as a pin extending from the connector to the inverter in one direction, and the interlock line is configured as a wire bendably extending from the connector to the inverter, wherein the wire comprises a conductive wire made of an electrically conductive material, a first interlock connector coupled to an end of the conductive wire, and a sheath configured to surround the conductive wire, wherein the inverter comprises a socket into which the pin is inserted, and a second interlock connector fastened to the first interlock connector, and wherein the second interlock connector is provided at a position spaced apart from the socket.

2. The electric compressor of claim 1, wherein the inverter further comprises a printed circuit board, wherein the socket is mounted on the printed circuit board at a position that faces the connector, and wherein the second interlock connector is mounted on the printed circuit board at a position that does not face the connector.

3. The electric compressor of claim 2, wherein the printed circuit board further comprises:

a first surface facing the connector; and a second surface configured to define a rear surface of the first surface, wherein the socket is provided on the first surface, and wherein the second interlock connector is provided on the second surface.

4. The electric compressor of claim 3, wherein the printed circuit board includes a wire passing hole through which the wire passes.

5. The electric compressor of claim 4, wherein the wire passing hole is formed to be debossed in an outer peripheral surface of the printed circuit board.

6. The electric compressor of claim 5, wherein the wire passing hole is formed to be smaller than the first interlock connector.

7. The electric compressor of claim 1, wherein a first one of the first interlock connector and the second interlock connector is configured as a male connector, and a second one of the first interlock connector and the second interlock connector is configured as a female connector.

* * * * *